United States Patent
Biskeborn et al.

(10) Patent No.: US 9,852,747 B1
(45) Date of Patent: Dec. 26, 2017

(54) SEGMENTED MAGNETIC RECORDING WRITE HEAD FOR WRITING TIMING-BASED SERVO PATTERNS

(71) Applicant: International Business Machines Corporation, Armonk, NY (US)

(72) Inventors: Robert G. Biskeborn, Hollister, CA (US); Edwin R. Childers, Tucson, AZ (US); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/273,483

(22) Filed: Sep. 22, 2016

(51) Int. Cl.
  *G11B 5/31* (2006.01)
  *G11B 5/008* (2006.01)

(52) U.S. Cl.
  CPC ........ *G11B 5/3116* (2013.01); *G11B 5/00813* (2013.01)

(58) Field of Classification Search
  None
  See application file for complete search history.

(56) References Cited

U.S. PATENT DOCUMENTS

| | | | |
|---|---|---|---|
| 4,539,615 A * | 9/1985 | Arai | G11B 5/4893 360/121 |
| 6,222,698 B1 * | 4/2001 | Barndt | G11B 5/00813 360/76 |
| 6,710,967 B2 | 3/2004 | Hennecken et al. | |
| 6,744,594 B2 | 6/2004 | Denison et al. | |
| 6,778,359 B1 * | 8/2004 | Iwama | G11B 5/584 360/129 |
| 7,206,170 B2 | 4/2007 | Yip | |
| 7,489,465 B2 | 2/2009 | Bates et al. | |
| 7,684,143 B2 | 3/2010 | Jaquette | |
| 7,920,356 B2 * | 4/2011 | Bui | G11B 5/584 360/77.12 |
| 8,068,302 B2 | 11/2011 | Dugas | |
| 8,144,424 B2 | 3/2012 | Dugas et al. | |
| 8,416,525 B2 | 4/2013 | Schwarz et al. | |
| 8,542,457 B2 | 9/2013 | Dugas | |
| 8,711,512 B2 * | 4/2014 | Kabelac | G11B 5/00826 360/121 |
| 9,105,291 B1 * | 8/2015 | Biskeborn | G11B 5/58 |

(Continued)

OTHER PUBLICATIONS

Biskeborn et al., U.S. Appl. No. 15/273,508, filed Sep. 22, 2016.

(Continued)

*Primary Examiner* — Will J Klimowicz
(74) *Attorney, Agent, or Firm* — Zilka-Kotab, P.C.

(57) ABSTRACT

An apparatus according to one embodiment includes a first module having a plurality of first write transducers, and a plurality of second modules each having a second write transducer. Planes of deposition of write gaps of the second write transducers are oriented at an angle of greater than 4 degrees relative to planes of deposition of write gaps of the first write transducers. An apparatus according to another embodiment includes a plurality of first modules each having a first write transducer, and a plurality of second modules each having a second write transducer. Planes of deposition of write gaps of the second write transducers are oriented at an angle of greater than 4 degrees relative to planes of deposition of write gaps of the first write transducers.

12 Claims, 14 Drawing Sheets

(56) References Cited

U.S. PATENT DOCUMENTS

| | | | |
|---|---|---|---|
| 9,355,665 B2* | 5/2016 | Biskeborn | G11B 5/584 |
| 9,373,346 B1* | 6/2016 | Bui | G11B 5/584 |
| 9,472,221 B1* | 10/2016 | Bui | G11B 5/584 |
| 9,653,098 B2 | 5/2017 | Torline | |
| 2004/0109261 A1 | 6/2004 | Dugas | |
| 2004/0120070 A1* | 6/2004 | Ito | G11B 5/584 360/76 |
| 2004/0174628 A1* | 9/2004 | Schwarz | G11B 5/00813 360/48 |
| 2004/0223248 A1* | 11/2004 | Dugas | G11B 5/00813 360/48 |
| 2005/0219734 A1* | 10/2005 | Rothermel | G11B 5/5928 360/75 |
| 2005/0259364 A1 | 11/2005 | Yip | |
| 2007/0047141 A1* | 3/2007 | Biskeborn | G11B 5/00826 360/129 |
| 2008/0186610 A1 | 8/2008 | Bui et al. | |
| 2008/0218891 A1 | 9/2008 | Gubbins et al. | |
| 2008/0239559 A1 | 10/2008 | Goker et al. | |
| 2009/0147399 A1 | 6/2009 | Dugas et al. | |
| 2009/0231757 A1* | 9/2009 | Biskeborn | G11B 5/1871 360/221 |
| 2011/0141604 A1 | 6/2011 | Dugas et al. | |
| 2012/0069473 A1 | 3/2012 | Dugas | |
| 2016/0196844 A1* | 7/2016 | Biskeborn | G11B 5/00826 360/75 |
| 2016/0254015 A1* | 9/2016 | Biskeborn | G11B 5/58 |

OTHER PUBLICATIONS

Wang et al., "Approaches to Tilted Magnetic Recording for Extremely High Areal Density," IEEE Transactions of Magnetics, vol. 39, No. 4, 2003, pp. 1930-1935.

Lim et al., "Perpendicular Magnetic Recording Process Using Finite-Element Micromagnetic Simulation," IEEE Transactions on Magnetics, vol. 42, No. 10, 2006, pp. 3213-3215.

Non-Final Office Action from U.S. Appl. No. 15/273,508, dated Jul. 21, 2017.

* cited by examiner

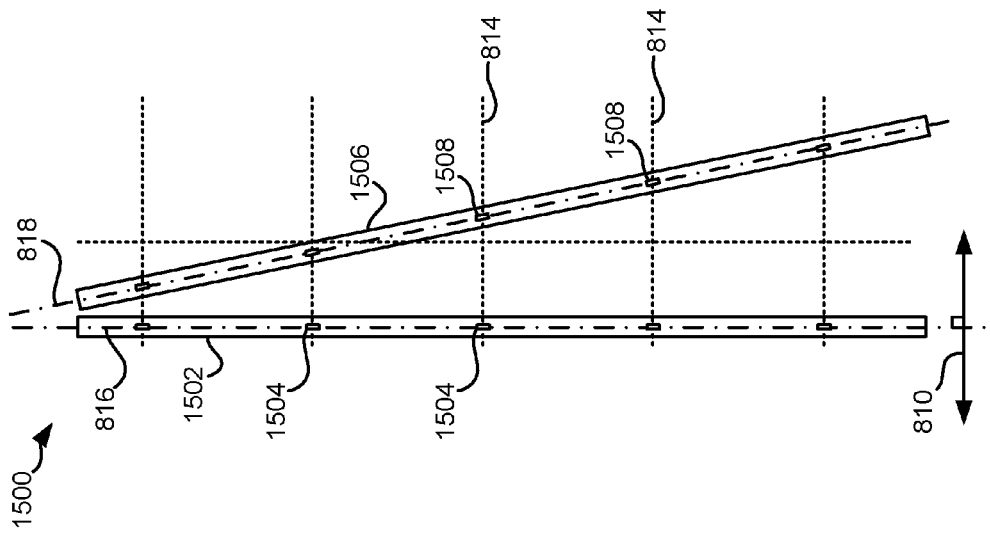
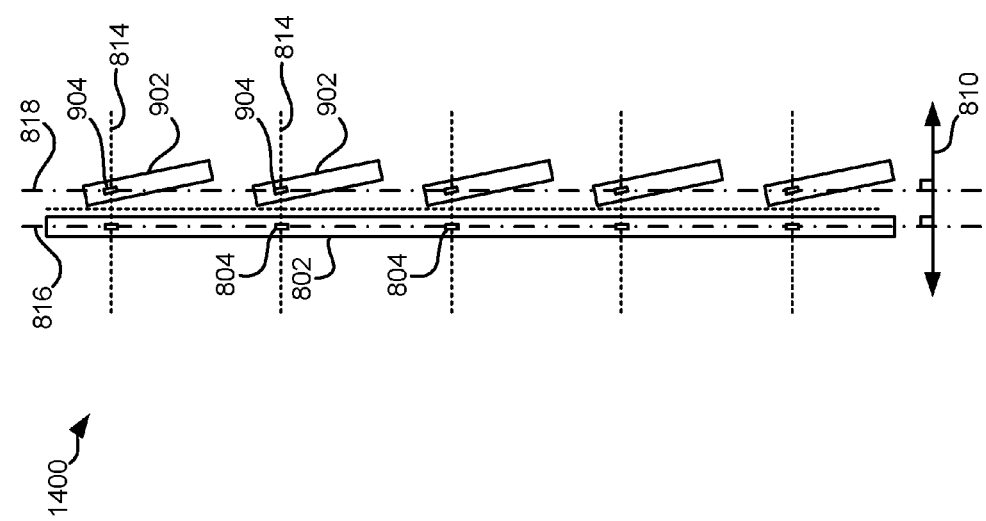

SEGMENTED MAGNETIC RECORDING WRITE HEAD FOR WRITING TIMING-BASED SERVO PATTERNS

BACKGROUND

The present invention relates to data storage systems, and more particularly, this invention relates to magnetic recording heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus according to one embodiment includes a first module having a plurality of first write transducers, and a plurality of second modules each having a second write transducer. Planes of deposition of write gaps of the second write transducers are oriented at an angle of greater than 4 degrees relative to planes of deposition of write gaps of the first write transducers.

An apparatus according to another embodiment includes a plurality of first modules each having a first write transducer, and a plurality of second modules each having a second write transducer. Planes of deposition of write gaps of the second write transducers are oriented at an angle of greater than 4 degrees relative to planes of deposition of write gaps of the first write transducers.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 14 is a top down view of a portion of a segmented magnetic recording write head, in accordance with one embodiment.

FIG. 15 is a top down view of a portion of a segmented magnetic recording write head, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a first module having a plurality of first write transducers, and a plurality of second modules each having a second write transducer. Planes of deposition of write gaps of the second write transducers are oriented at an angle of greater than 4 degrees relative to planes of deposition of write gaps of the first write transducers.

In another general embodiment, an apparatus includes a plurality of first modules each having a first write transducer, and a plurality of second modules each having a second write transducer. Planes of deposition of write gaps of the second write transducers are oriented at an angle of greater than 4 degrees relative to planes of deposition of write gaps of the first write transducers.

Figure 1A:
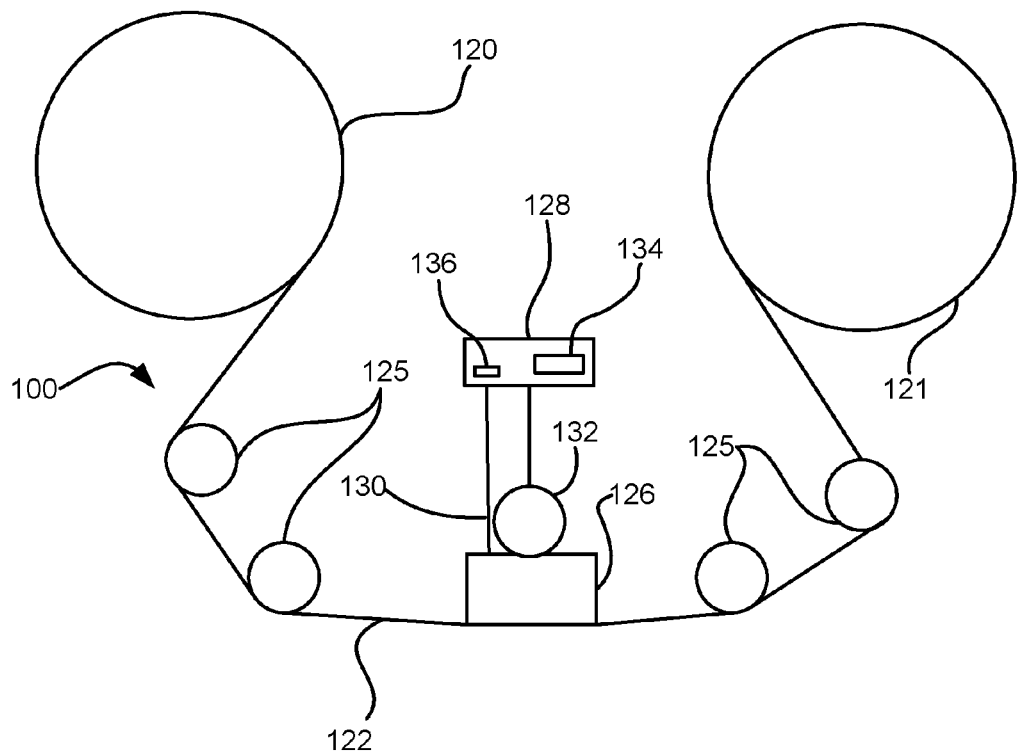
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
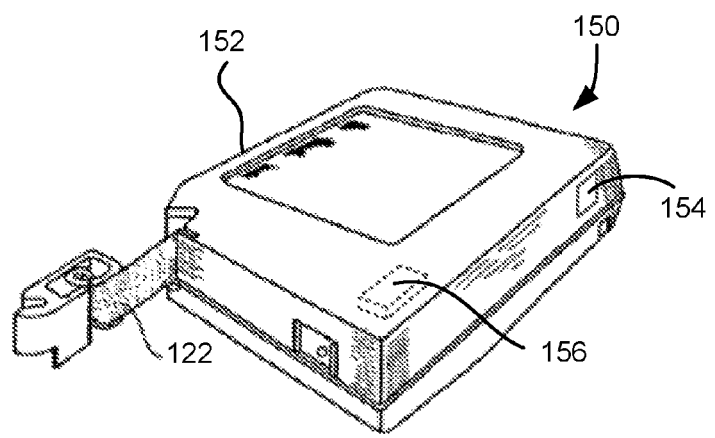
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
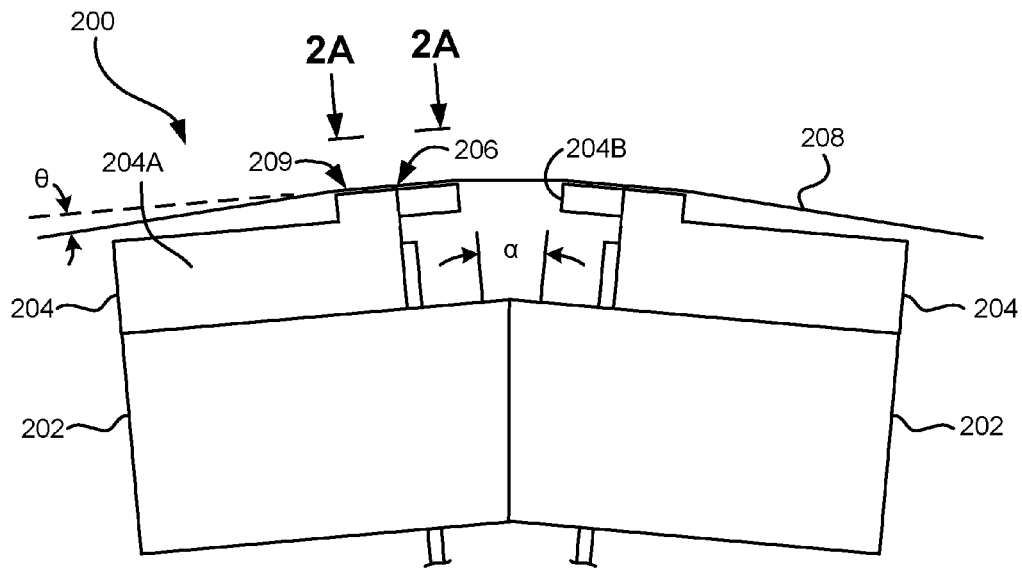
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
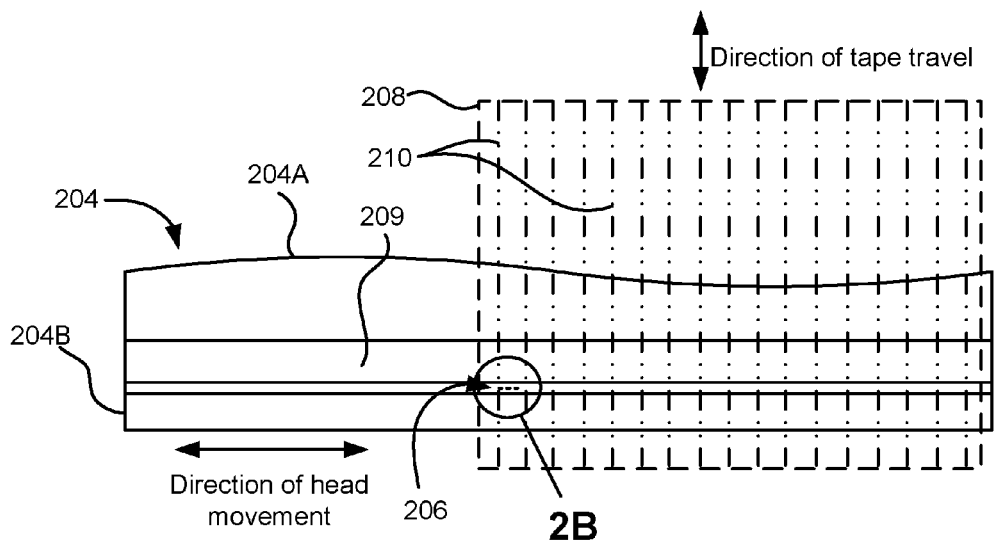
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
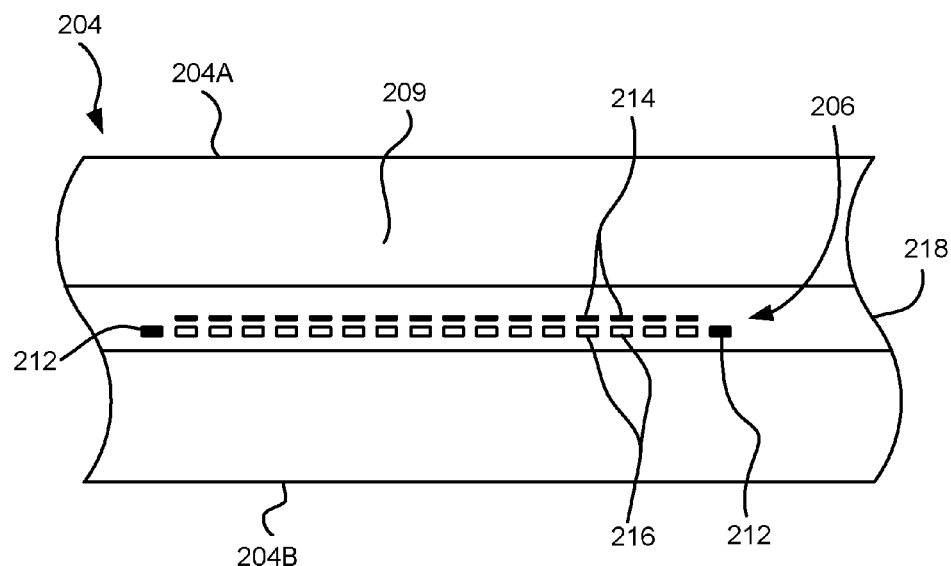
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
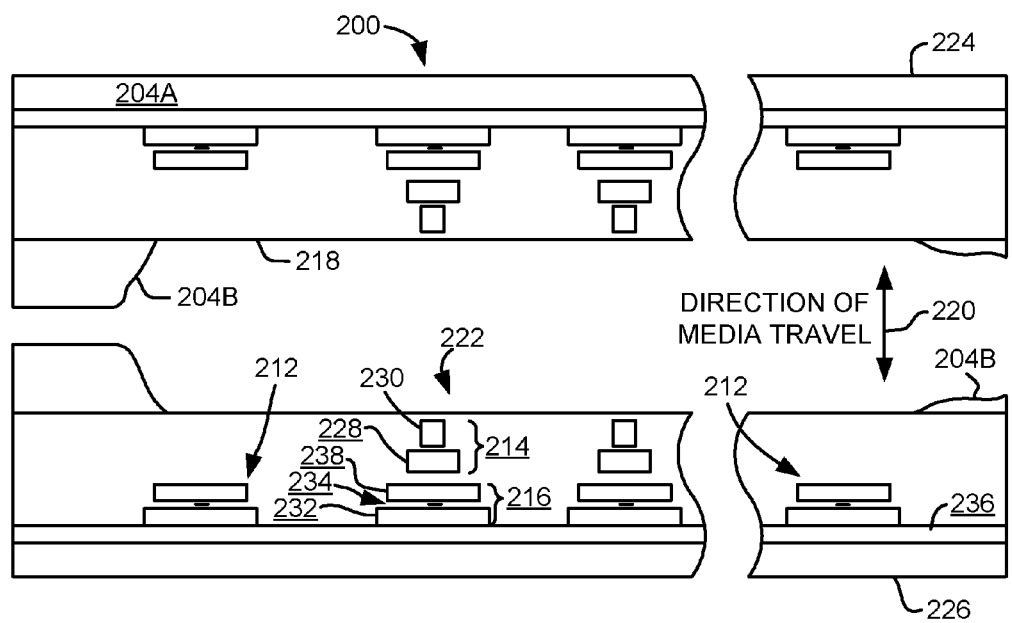
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
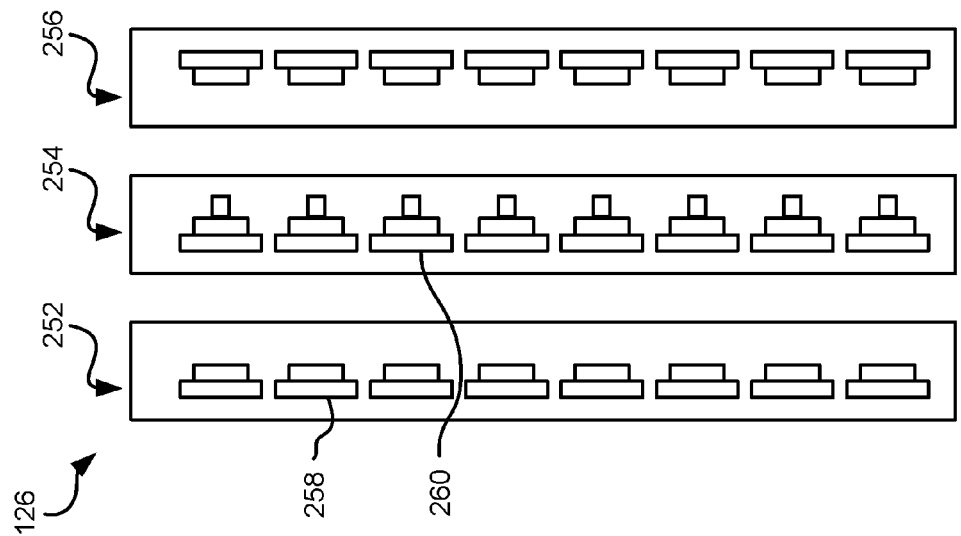
FIG. 4 is a partial tape bearing surface view of a magnetic head having a read-write-read configuration.
Figure 3:
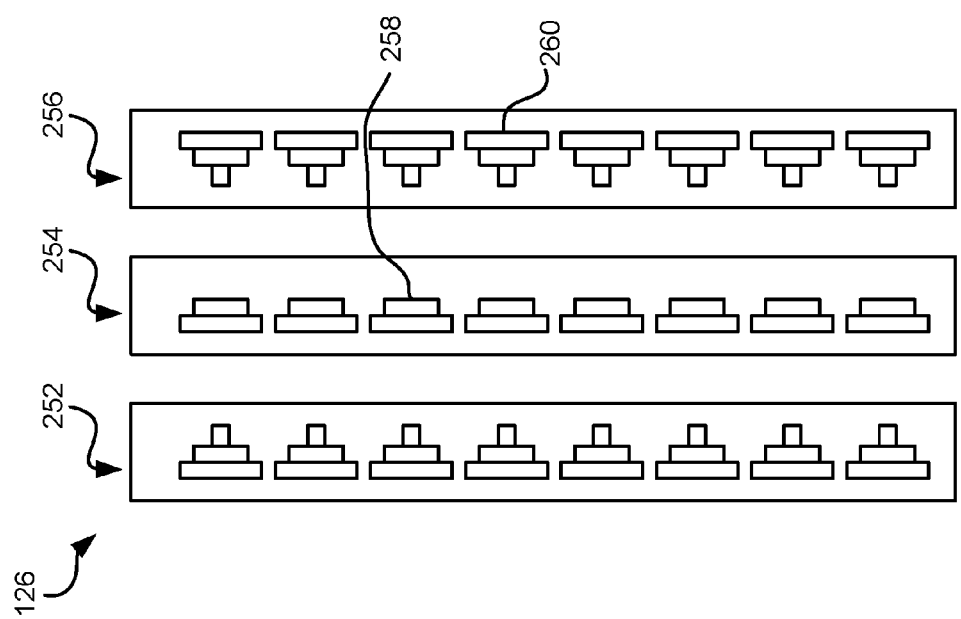
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
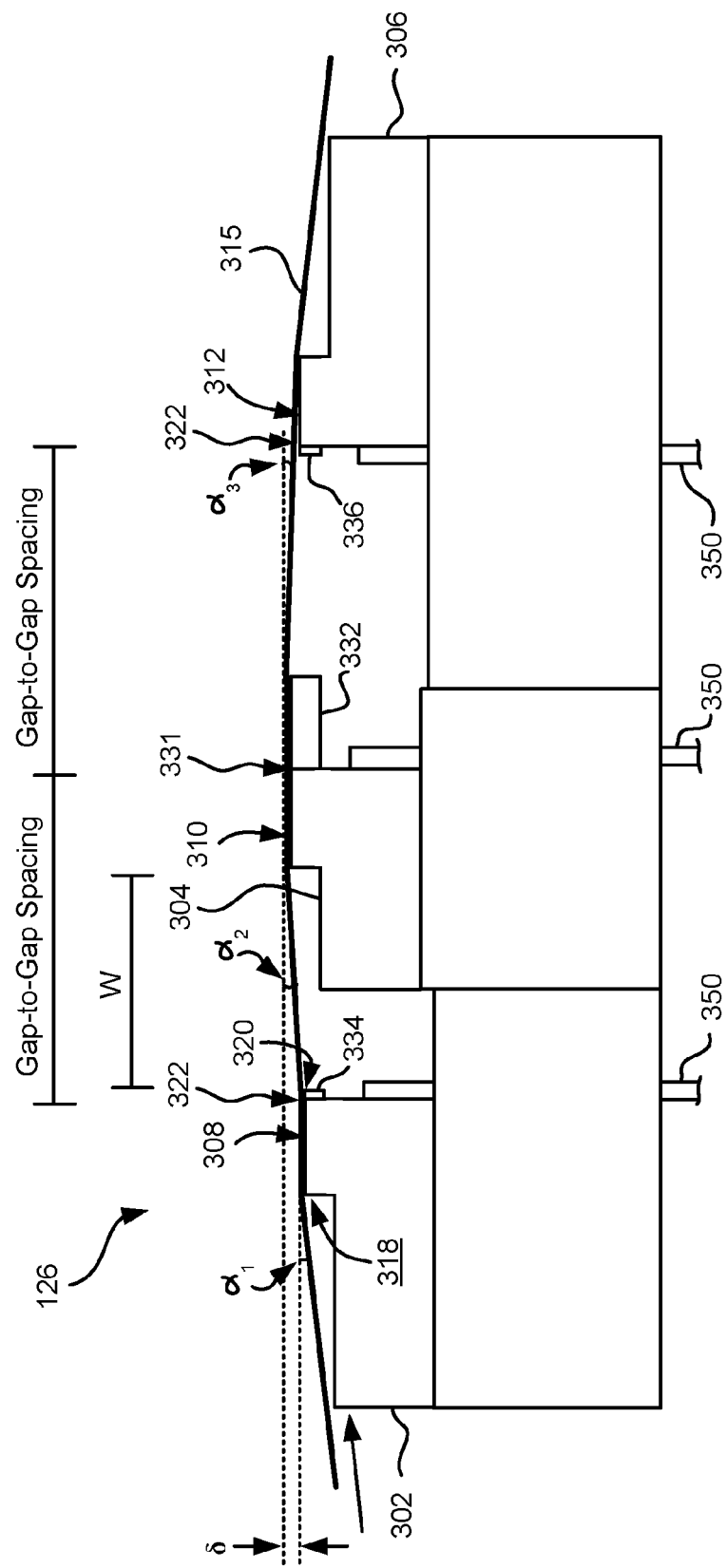
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
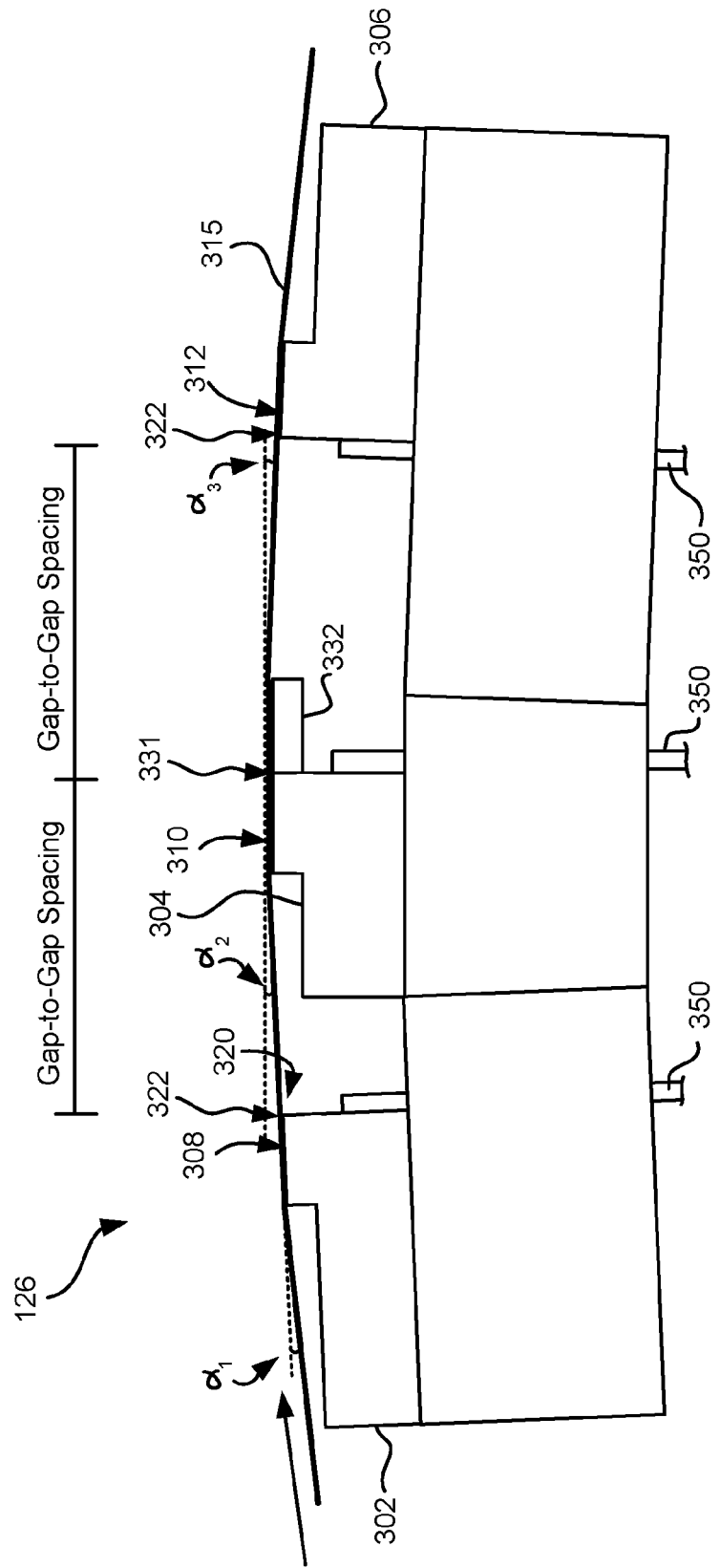
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
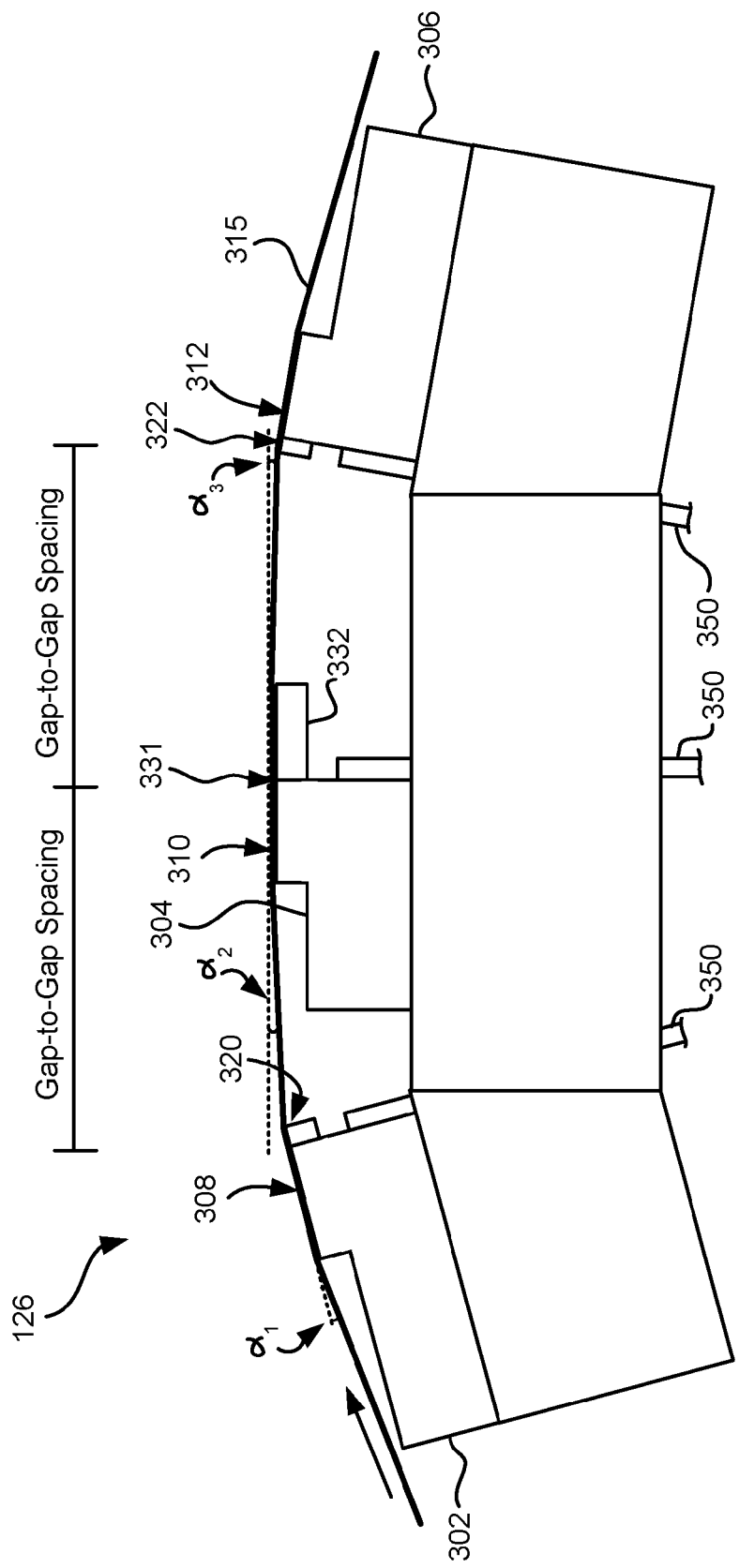
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Conventional magnetic heads for writing servo patterns may include planar thin film heads and/or planar surface thin film heads. Methods used to fabricate such heads may include methods that are sometimes used for manufacturing conventional vertical write heads.

For example, one conventional fabrication method may include depositing a blanket film of ferromagnetic material on top of a tape head, and then processing chevron patterns into the deposited film.

Another conventional fabrication technique may include developing a planar fashion wafer with pancake- or helical-type coils, e.g., where the plane of deposition may be substantially similar and/or substantially parallel to the plane of the tape bearing surface of the head.

It may be noted however, that additional processes not typically used for conventional vertical heads are required during these and/or other fabrication methods of conventional heads, e.g., such as to fabricate the angled gaps for writing timing-based servo patterns. Such additional processes make conventional servo writing magnetic heads more difficult to manufacture, as the additional processes may not be of common practice in the magnetic head industry. For example, planar thin film heads may implement chemical mechanical planarization (CMP) steps for achieving effective throat height; however maintaining this height over the entire wafer surface may be challenging. Furthermore, planar surface thin film heads may include processing write gaps on the tape bearing surface of conventional heads, which may also prove a challenge to create.

Embodiments described herein include segmented magnetic write heads with maintained design spacing, e.g., design write gap spacing, design throat heights, design write transducer spacing, etc.

Figure 9:
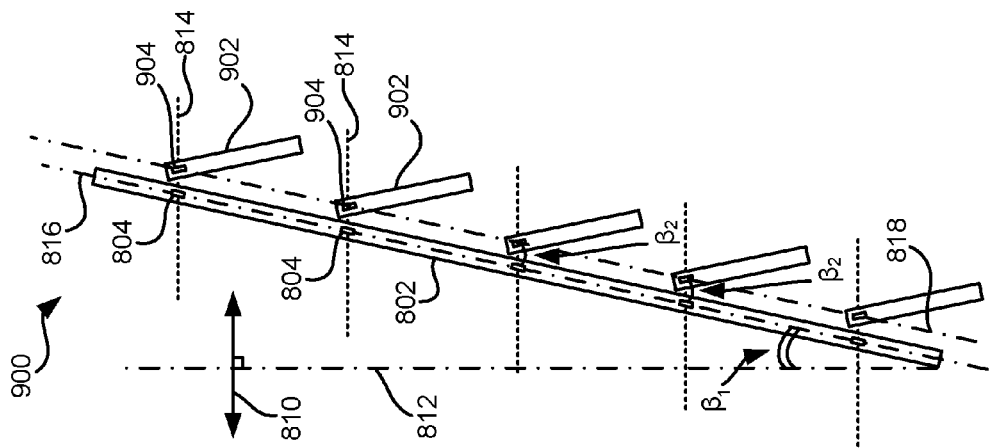
FIG. 9 is a top down view of a portion of a segmented magnetic recording write head, in accordance with one embodiment.
Figure 8:
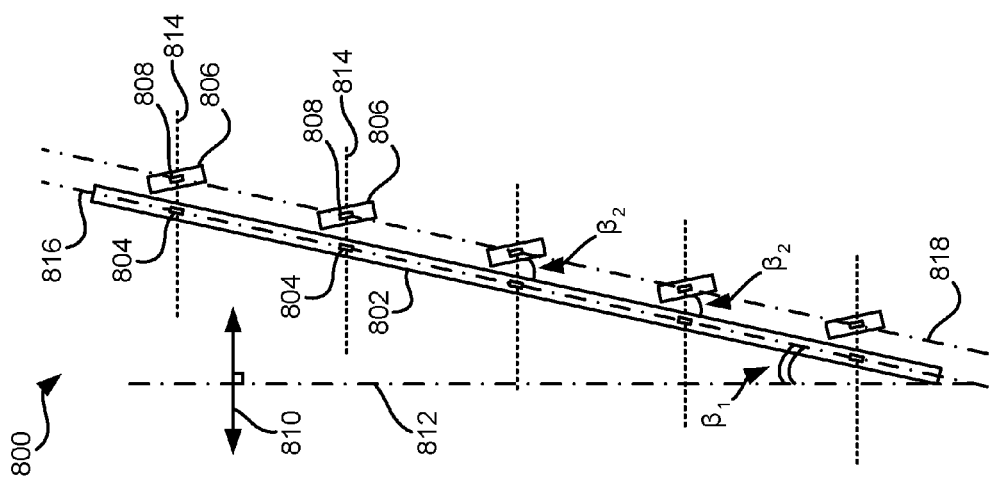
FIG. 8 is a top down view of a portion of a segmented magnetic recording write head, in accordance with one embodiment.

FIGS. 8-9 depict apparatuses 800, 900 in accordance with various embodiments. As an option, the present apparatuses 800, 900 may be implemented in conjunction with features from any other embodiment listed herein, such as those described with reference to the other FIGS. Of course, however, such apparatuses 800, 900 and others presented herein may be used in various applications and/or in permutations which may or may not be specifically described in the illustrative embodiments listed herein. Further, the apparatuses 800, 900 presented herein may be used in any desired environment.

Referring now to FIG. 8, apparatus 800 includes a first module 802 having a plurality of first write transducers 804.

Apparatus 800 includes a plurality of second modules 806 each having a second write transducer 808. The second modules 806 may be constructed, for example, by dicing a conventional module, e.g., a duplicate of module 802, into the individual modules. In other approaches, the second modules 806 may be discretely formed modules.

The relative orientation of the plane of deposition of write gaps of the first write transducers relative to the orientation of the plane of deposition of the write gaps of the second write transducers may vary according to various approaches. For example, planes of deposition of write gaps of the second write transducers 808 may be oriented at an angle $\beta_2$ of greater than 4 degrees relative to planes of deposition of write gaps of the first write transducers 804, preferably in a range of about 6 degrees to about 25 degrees.

The orientations of the planes of deposition of write gaps of the second write transducers 808 may be fixed relative to the planes of deposition of write gaps of the first write transducers 804 by setting the orientations of the modules 802, 806 with respect to one another.

The first write transducers 804 may be aligned along a first straight line 816, where the first straight line 816 is oriented at an angle $\beta_1$ of greater than 4 degrees from perpendicular to an intended direction of tape travel 810 thereacross. It may be noted that line 812 may be used as a reference line that is perpendicular to an intended direction of tape travel 810.

According to one approach, the angle $\beta_1$ may be preferably about 6 degrees or larger. According to another approach, the angle $\beta_1$ may be between 4 and 20 degrees. According to yet another approach, the angle $\beta_1$ may be about 12 degrees.

The second write transducers 808 may be aligned along a second straight line 818. The second straight line 818 may be parallel to the first straight line 816.

It should be noted that angle $\beta_2$ is often two times the angle $\beta_1$, but may have a different value, depending on the embodiment.

In a preferred embodiment, the angles $\beta_2$ may all be the same. In other approaches, however, some angles $\beta_2$ may be different than other angles $\beta_2$, all angles $\beta_2$ may be different, etc.

Each first write transducer 804 may be aligned with an associated second write transducer 808 in the intended direction of tape travel 810, e.g., see alignment illustrated by line 814.

The distances between the aligned write gaps of the first write transducer 804 and the associated second write transducer 808 are preferably the same, as shown. However, the distances between the write gaps of associated transducer pairs may vary and/or be adjusted depending on the embodiment. See, e.g., FIGS. 13A-13B and 15.

According to preferred embodiments, the spacing between the write gaps of each first write transducer 804 and the associated second write transducer 808 may be relatively large, such as greater than 0.5 mm, e.g., about 0.5 to 1.0 mm or greater.

The spacing between the write transducers, in each array and/or in each pair, may be selected to meet requirements of writing known timing-based servo patterns. For example, the spacing between write transducers may be selected to compensate for tilting of the head relative to the tape motion direction in use.

The second write transducers 808 (five second write transducers 808 shown in the present FIGS. for purposes of an example) together may be equivalent to a head image on a servo-writer wafer. The five second write transducers 808 may be configured to write five servo tracks that define four magnetic recording tape data bands therebetween.

Aligning corresponding write transducers 804, 808 in the intended direction of tape travel 810 may allow the transducers 804, 808 to write servo data to a magnetic recording tape, which will now be briefly described below.

It should briefly be noted that to write such servo marks, apparatus 800 may include a drive mechanism for passing a magnetic recording tape over the modules. Apparatus 800 may also include a controller electrically coupled to the modules 802, 806. The controller may be configured to control a timing of writing by the write transducers 804, 808. In one approach, the apparatus 800 may be configured to have at least some of the features of FIG. 1A.

With continued reference to FIG. 8, the write transducers 804, 808 may be configured to write elongated servo marks. The elongated servo marks may each have a longitudinal axis oriented parallel to the associated plane of deposition of the write gap of the respective write transducer writing the servo mark. The servo marks may be written into any type of servo pattern, such as conventional servo patterns. Servo marks oriented at an angle relative to one another can be considered to be oriented in a chevron pattern, e.g., /\, /|, |\, /|\, /|/, |/|, etc. Moreover, several servo marks may be arranged together in clusters, e.g., /////\\\\\, /////||||\\\\\, /////||||//////, etc. by repeatedly firing the appropriate write transducer at the proper time to create the desired pattern.

When writing servo marks on the magnetic recording tape, each of the first write transducers 804 may be fired (perform a write) independently of and/or in sync with other ones of the first write transducers 804.

Similarly, when writing servo marks on the magnetic recording tape, each of the second write transducers 808 may be fired independently of and/or in sync with other ones of the second write transducers 808.

According to one embodiment, while writing servo marks to a particular servo track of the magnetic recording tape, the first write transducer 804 and the second write transducer 808 of an associated write transducer pair may fire in sync with one another during a write operation. For purposes of an example, in FIG. 8, the first write transducer 804 and the second write transducer 808 of an associated write transducer pair firing in sync may write a chevron pattern to the magnetic recording tape.

The chevron pattern may be written by the first write transducer 804 and the second write transducer 808 of an associated write transducer pair firing independently, with a time delay occurring between each transducer firing sequence. Firing the first write transducer 804 and the second write transducer 808 of an associated write transducer pair independently with a time delay may compress the bars in the chevron pattern of the written data, e.g., to maintain and enable condensed servo patterns. Thus, by independently controlling the timing of writing of the servo marks, the spacing between the pairs of write transducers 804, 808 may be wider, thereby making the apparatus easier to fabricate.

A time delay may also be implemented between writing of chevron patterns by respective transducer pairs, to compensate for the transducers 804, 808 being aligned along the first straight line 816 at the angle $\beta_1$ from perpendicular to the intended direction of tape travel 810 thereacross. Implementing such a time delay while servo writing may enable vertical alignment between the written chevron patterns written by each transducer pair.

Referring now to FIG. 9, apparatus 900 is shown to include a plurality of second modules 902 each having a second write transducer 904. The second write transducers 904 of the second modules 902 may be located on an upper portion of the second modules 902. Such a transducer orientation may enable alignment of the associated transducer pairs of apparatus 900 with shorter spacing between aligned transducer pairs, as the second modules 902 of apparatus 900 are longer than the second modules 806 of apparatus 800 of FIG. 8.

The second modules 902 may be constructed by dicing a conventional module, e.g., a duplicate of module 802, into the individual modules. In other approaches, the second modules 902 may be discretely formed modules. The longer individual modules 902 allow positioning of the writer closer to one end, which in turn allows reduction in separation between the opposing modules 802, 902, while providing a longer beam for securing the second modules 902.

Configuration and operation of apparatus 900 of FIG. 9 may be similar to that described for apparatus 800 of FIG. 8.

Various configurations of media bearing surfaces of illustrative transducer pairs will now be described.

FIGS. 10A-12B depict illustrative transducer pairs 1000, 1100, 1200 in accordance with multiple embodiments. As an option, the present transducer pairs 1000, 1100, 1200 may be implemented in conjunction with features from any other embodiment listed herein, such as those described with reference to the other FIGS. Of course, however, such transducer pairs 1000, 1100, 1200 and others presented herein may be used in various applications and/or in permutations which may or may not be specifically described in the illustrative embodiments listed herein. Further, the transducer pairs 1000, 1100, 1200 presented herein may be used in any desired environment.

Figure 10A:
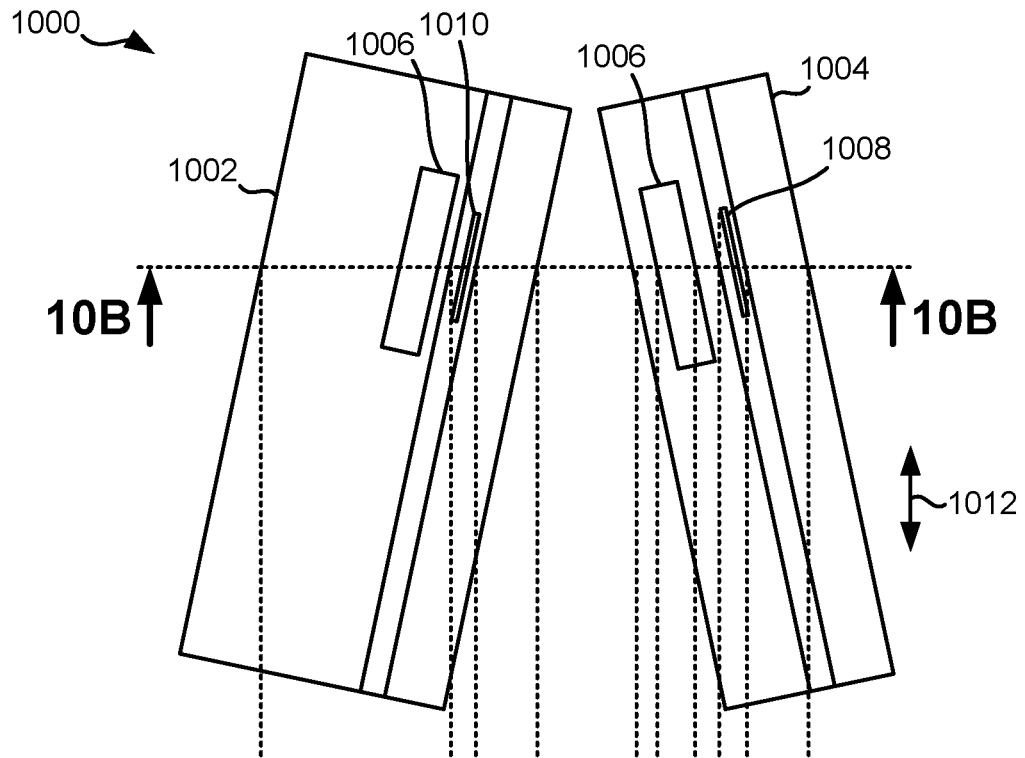
FIG. 10A is a side view of an illustrative transducer pair, in accordance with one embodiment.
Figure 10B:
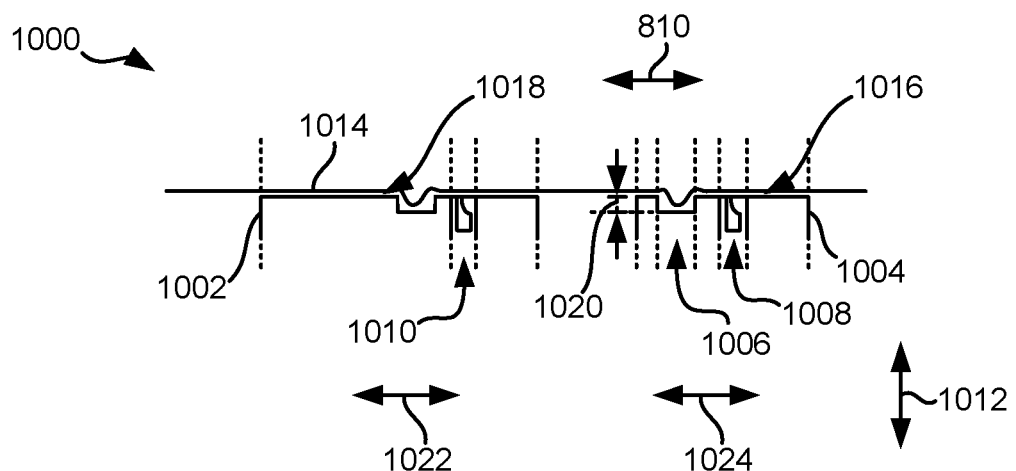
FIG. 10B is a cross-sectional view of the illustrative transducer pair of FIG. 10A taken along line 10B of FIG. 10A.

FIG. 10A, illustrates a top down (media facing surface) view of the transducer pair 1000. FIG. 10B is a cross-sectional side view taken along a line 10B of FIG. 10A.

The transducer pair 1000 includes a first module 1002 which may have one or more first write transducers 1010. The transducer pair 1000 includes a second module 1004 which may have one or more second write transducers 1008. It should be noted that although FIGS. 10A-12B show modules having only a single write transducer, e.g., the first module 1002 shown having the write transducer 1010, as shown elsewhere herein one or both of the modules of FIGS. 10A-12B may include a plurality of write transducers, e.g., see FIGS. 8-9, 13-17.

As illustrated in FIG. 10B, the media bearing surfaces 1018, 1016 of the modules 1002, 1004 may be primarily planar. In embodiments where the media bearing surfaces 1018, 1016 of the modules 1002, 1004 are primarily planar, the planar portions of the media bearing surfaces 1018, 1016 may lie along a common plane.

To align the planar media bearing surfaces 1018, 1016 of the modules 1002, 1004 the media bearing surfaces 1018, 1016 may be placed onto an optical flat or mechanical alignment apparatus having equivalent function, such as using autocollimators and/or laser focusing. Thereafter, each of the modules 1002, 1004 may be adjusted in one or more alignment directions, designated by arrows 1012, 1022, 1024. For example, the media bearing surfaces 1018, 1016 may be angled slightly relative to one other to create a skiving leading edge on the trailing module 1004.

According to one embodiment, once aligned in a desired position, components of the transducer pair 1000 may be permanently secured in position relative to one another, e.g., with glue, with a clamp, with a screw, etc. For example, the modules 1002, 1004 may be adhered to a common substrate, thereby forming a write head, which in turn may be installed in a drive.

According to another embodiment, components of the transducer pair 1000 may be translatable in operation, e.g., to facilitate an additional alignment strategy. For example, adjustments may be made to the orientations modules 1002, 1004 as the magnetic recording tape 1014 is passed over the media bearing surfaces 1018, 1016, where the timings of the signals in each module 1002, 1004 may be adjusted to achieve the desired pattern on the magnetic recording tape 1014.

Alignments may be set using precision translation stages. According to one embodiment alignment adjustments may be made using a precision optical encoder stage. According to another embodiment, alignment adjustments may be made using a piezo actuator, e.g., for very finite adjustments during track following.

The finiteness of precision translation stages may vary according to the embodiment. According to one approach, the precision translation stages may have at least a 10 nm resolution. According to another approach, the precision translation stages may have at least an 8 nm resolution.

Such adjustments may be performed as a magnetic recording tape 1014 is passed over the media bearing surfaces 1018, 1016, where the timings of the signals in each module 1002, 1004 may be adjusted to achieve the desired pattern on the magnetic recording tape 1014.

A head that includes the transducer pair 1000 may be rotated in use, e.g., to compensate for tape skew.

Referring to FIGS. 10A and 10B, at least one of the modules 1002, 1004 may include a well 1006 extending into a respective media bearing surface 1016, 1018 thereof. The well 1006 may be configured to create a vacuum, i.e., a region of sub-ambient air pressure, therein when a magnetic recording tape 1014 is passed thereacross, e.g., in the intended direction of tape travel 810. The vacuum may be created very quickly after the magnetic recording tape is advanced over the well 1006, e.g., such as in a fraction of a second.

The magnetic recording tape 1014 is shown in FIG. 10B dipping into the well 1006 during magnetic recording tape travel. Again, although the second module 1004 is shown to include the well 1006, according to further embodiments, modules other than the second module 1004 may alternatively or additionally include a well, e.g., such as the first module 1002.

The well 1006 may have a depth 1020 of up to 10 microns or more, e.g., in a direction that extends into the media bearing surface 1016. The depth 1020 of the well 1006 may vary according to various embodiments.

Tacking the magnetic recording tape 1014 downward toward the media bearing surfaces 1018, 1016 during magnetic recording tape 1014 travel promotes close head-to-magnetic recording tape 1014 spacing, thereby minimizing spacing loss and promoting formation of sharp magnetic transitions on the tape.

According to one embodiment, wrap angles of the magnetic recording tape may be adjusted, e.g., to a low or high wrap angle, in response to the vacuum tacking the magnetic recording tape downward.

Figure 11A:
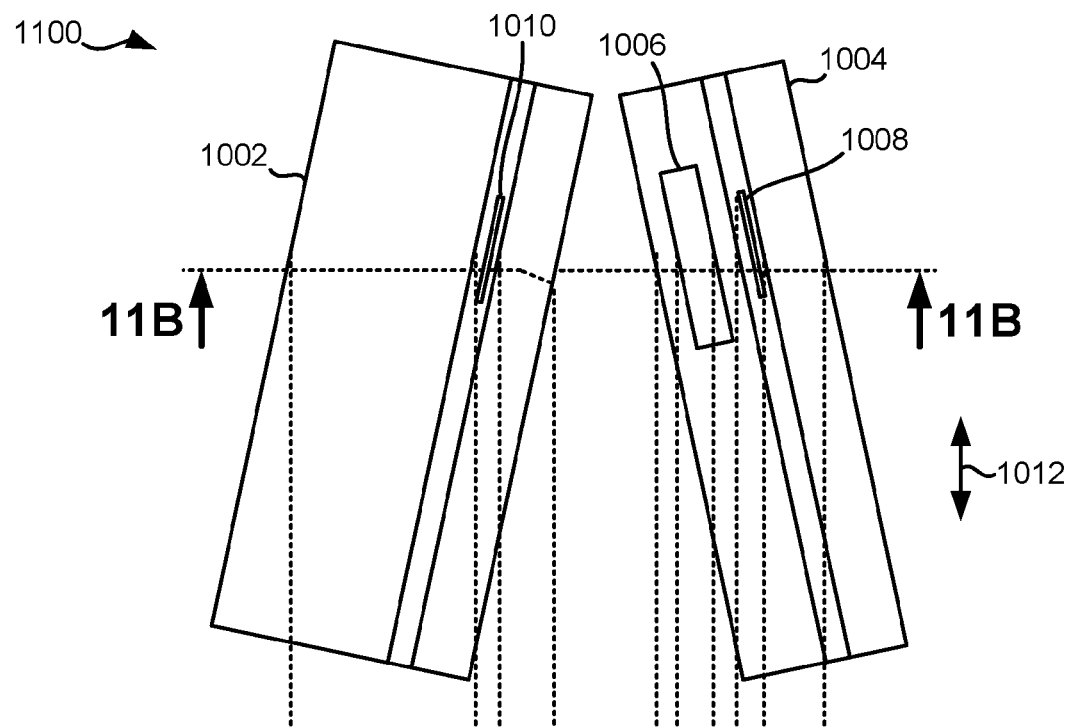
FIG. 11A is a side view of an illustrative transducer pair, in accordance with one embodiment.
Figure 11B:
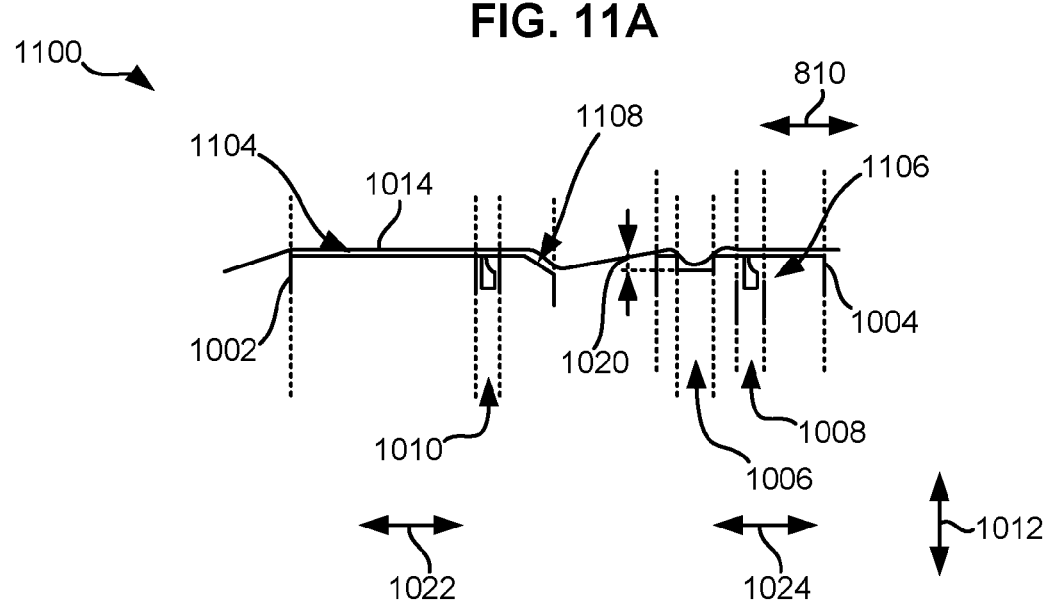
FIG. 11B is a cross-sectional view of the illustrative transducer pair of FIG. 11A taken along line 11B of FIG. 11A.

Referring now to FIG. 11A, a top down view of a transducer pair 1100 is illustrated according to one embodiment. FIG. 11B, illustrates a cross-sectional side view of the transducer pair 1100, taken along a line 11B of FIG. 11A. Various features of transducer pair 1100 may be similar to those of transducer pair 1000 of FIGS. 10A-10B, and therefore have common numbering therewith.

While the media bearing surfaces of the modules in FIGS. 10A-10B are primarily planar, the media bearing surface, e.g., a first media bearing surface 1104 of the module 1002 of FIG. 11B has a beveled trailing end 1108. The first media bearing surface 1104 of the module 1002 of FIG. 11B is preferably primarily planar.

In such embodiments, the primarily planar portions of the media bearing surfaces 1104, 1106 of the modules 1002, 1004 may lie along a common plane. In addition, at least one of the modules 1002, 1004, e.g. preferably the leading module(s), has a beveled trailing end 1108 that is preferably configured to cause a magnetic recording tape 1014 passing over the beveled trailing end 1108 to approach the trailing module 1004 at a wrap angle sufficient to cause skiving of air therefrom.

According to one approach, the wrap angle sufficient to cause skiving of air may be at least 0.1 degrees. According to another approach, the wrap angle sufficient to cause skiving of air may be at least 0.3 degrees. According to yet another approach, the wrap angle sufficient to cause skiving of air may be at least 0.5 degrees.

Figure 12A:
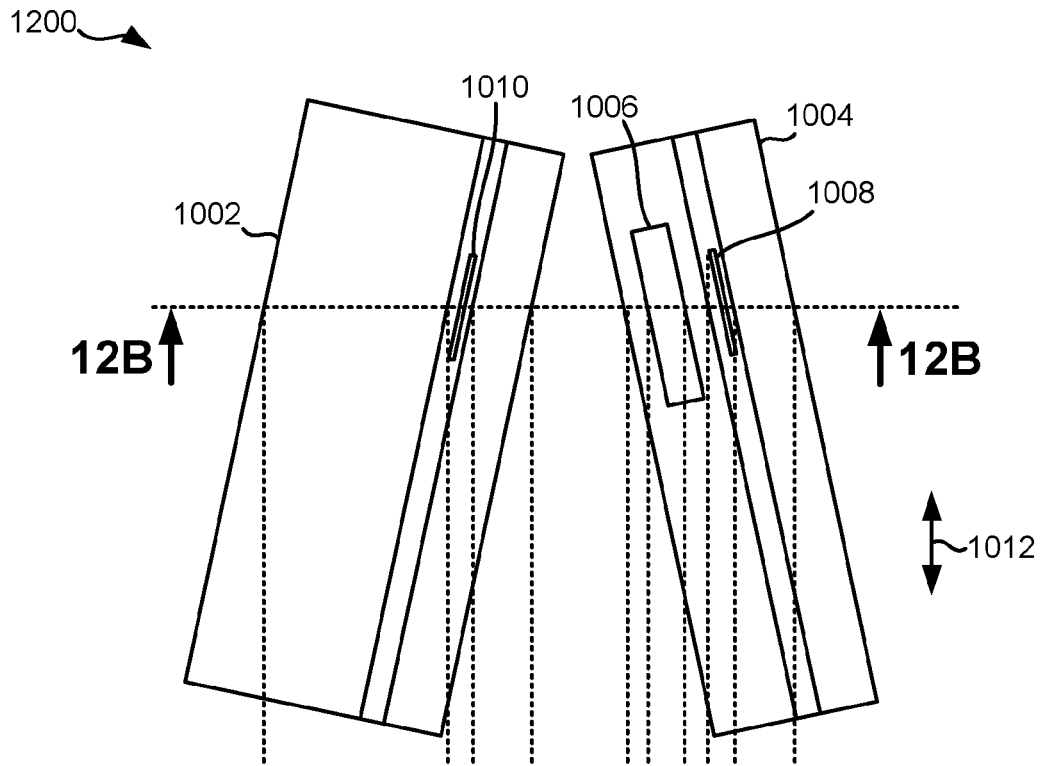
FIG. 12A is a side view of an illustrative transducer pair, in accordance with one embodiment.
Figure 12B:
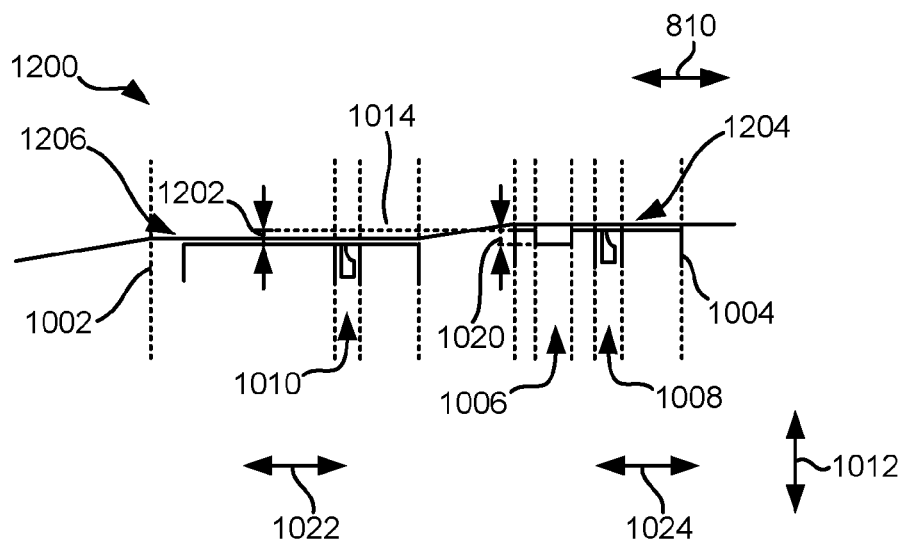
FIG. 12B is a cross-sectional view of the illustrative transducer pair of FIG. 12A taken along line 12B of FIG. 12A.

Referring now to FIG. 12A, a top down view of a transducer pair 1200 is illustrated in accordance with one embodiment. FIG. 12B, illustrates a cross-sectional side view of the transducer pair 1200, taken along a line 12B of FIG. 12A.

Media bearing surfaces, e.g., a first media bearing surface 1204 and a second media bearing surface 1206, of the modules 1002, 1004 may be primarily planar. The media bearing surfaces 1204, 1206 of the modules 1002, 1004 may lie primarily along offset parallel planes.

The depth of the offset 1202 separating the offset parallel planes may vary depending on the embodiment. According to one approach, the offset 1202 may measure at least 0.25 µm. According to another approach, the offset 1202 may measure at least 1 µm to promote skiving of air therefrom, e.g., as the tape 1014 travels left to right in FIG. 12B. According to yet another approach, the offset 1202 may measure at least 1.75 µm. An illustrative offset 1202 is between about 0.5 and about 2 µm. The amount of offset will generally be related to the distance between module edges and the desired wrap angle.

FIGS. 13A-17 depict apparatuses 1300-1700 in accordance with various embodiments. As an option, the present apparatuses 1300-1700 may be implemented in conjunction with features from any other embodiment listed herein, such as those described with reference to the other FIGS. Of course, however, such apparatuses 1300-1700 and others presented herein may be used in various applications and/or in permutations which may or may not be specifically described in the illustrative embodiments listed herein. Further, the apparatuses 1300-1700 presented herein may be used in any desired environment.

Figure 13B:
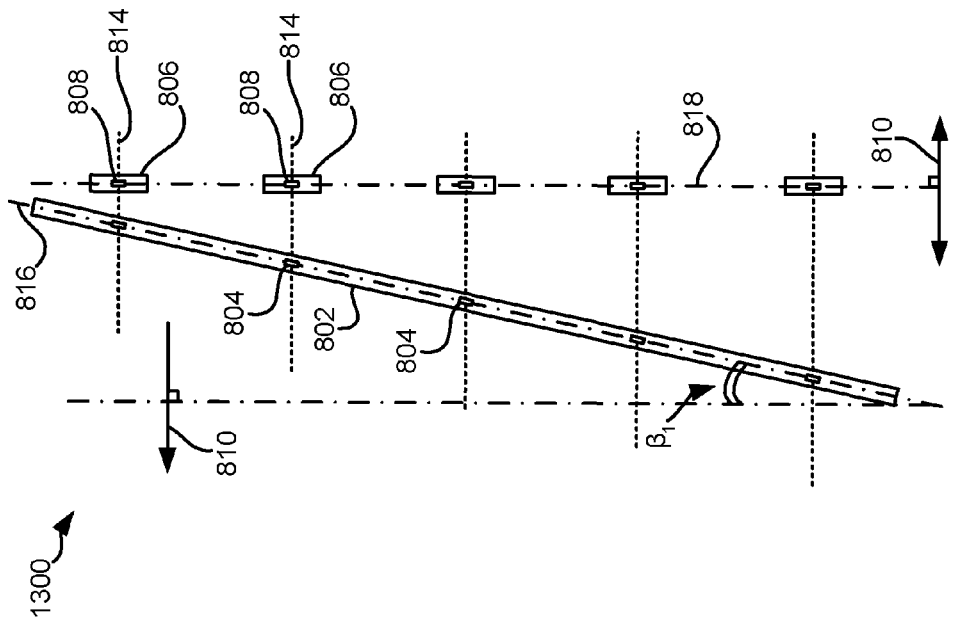
FIG. 13B is a top down view of a portion of a segmented magnetic recording write head, in accordance with one embodiment.
Figure 13A:
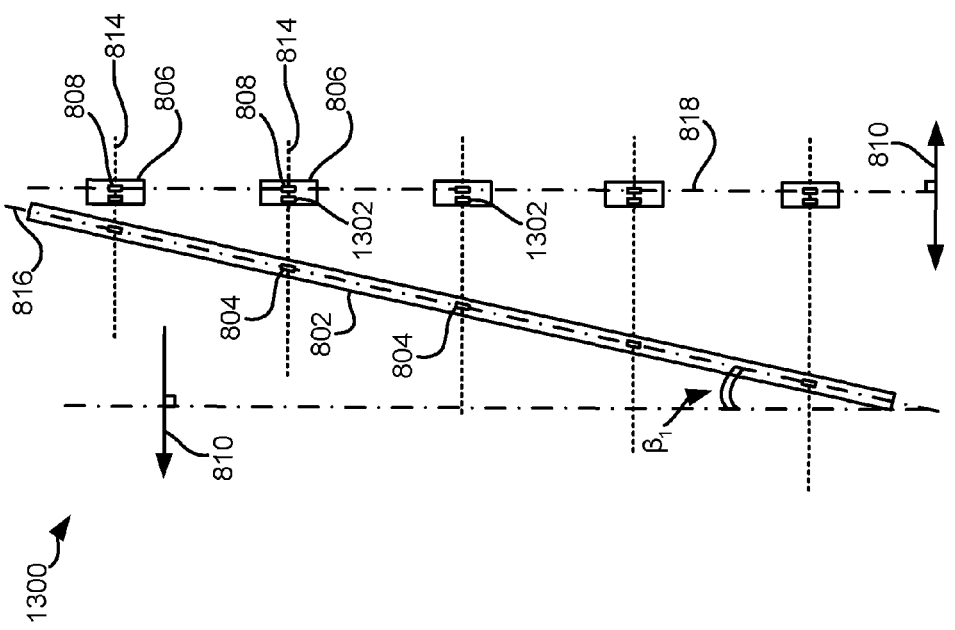
FIG. 13A is a top down view of a portion of a segmented magnetic recording write head, in accordance with one embodiment.

Referring now to FIG. 13A, apparatus 1300 includes a first module 802 having a plurality of first write transducers 804. Apparatus 1300 also includes a plurality of second modules 806 each having a second write transducer 808.

The first write transducers 804 may be aligned along a first straight line 816. The second write transducers 808 may be aligned along a second straight line 818. The second straight line 818 is non-parallel to the first straight line 816. The second straight line 818 may be oriented perpendicular to the intended direction of tape travel 810 thereacross as shown, or at some other angle.

In this and/or any other embodiment herein, at least one of the modules 802, 806 of apparatus 1300 may include a read transducer 1302 configured to detect a magnetic transition along an edge of one of the written magnetic bars written by a leading one of the modules (the leading module may depend on the direction the magnetic tape is traveling).

According to various embodiments, a read transducer may be positioned adjacent the write transducers 804, 808. According to one approach, as shown in FIG. 13A, the read transducers 1302 may be positioned between write transducers 804, 808 that are aligned in an intended direction of tape travel thereacross.

As previously described elsewhere above, a controller, which may be electrically coupled to the modules 802, 806, may be configured to control a timing of writing by the write transducers 804, 808. According to one embodiment, the controlling of timing of writing by the write transducers 804, 808 may be based, e.g., at least in part, on detection of the magnetic transition or a sequence of transitions by at least one of the read transducers 1302.

According to one approach, in response to detecting one or more magnetic transitions, the controller may instruct one or more of the write transducers 804, 808 to perform one or more write operations. The one or more write operations may be performed by one or more of the write transducers 804, 808 at the time of detection, or after some predefined time delay.

According to another approach, the controlling may be based on a specific predefined series of magnetic transitions. For example, assume the reader transducers 1302 are on the left module 802, and the tape is traveling right to left. The writer transducers 808 of the modules 806 simultaneously write a series of magnetic transitions. The controller may wait to instruct a trailing write transducer 804 to perform a write sequence until three synchronous magnetic transitions are detected. In this example, instructing a write sequence to be performed once three synchronous magnetic transitions are detected may at least in part enable longitudinal alignment between the written servo mark clusters of each associated transducer pair, e.g., the detection is used to correct for the varying spacing between the writer pairs, e.g., as in FIG. 13A.

In one approach, the second write transducers 808 and the read transducers 1302 may be configured as piggyback writer-reader pairs. In such embodiments, a primary goal may be to orient the read transducers 1302 upstream of the downstream write transducers, relative to the direction of magnetic recording tape travel.

According to one approach, this goal may be met by rotating the head 180 degrees from its normal positioning. According to another approach, this goal may be met by building the read transducers 1302 above the write transducers 804, 808 in a wafer, and then triggering the firing of the associated bar after the companion reader transducer 1302 detects the most previously written leading bar. In yet another embodiment, the readers may be incorporated in separate modules, which are then attached to the writer modules.

The various apparatus layouts described above may reduce or eliminate disturbances that result from magnetic recording tape velocity variation in the time interval between bars, and thereby enable a very precise and/or flexible bar positioning.

The read transducer detecting the leading bar may trigger the firing of the trailing bar after a time delay, e.g., thereby completing a patterned servo mark. According to one approach, the time delay may be based on a predefined algorithm. According to another approach, the time delay may be built into an apparatus as a precision spacing between a read transducer and a write transducer, as achieved in thin film processing.

Referring now to FIG. 13B, for purposes of an example, the first module 802 and the second modules 806 of apparatus 1300 are shown to not include read transducers.

According to one embodiment, in response to the spacing between write transducers in an associated pair being of varying lengths, a controller may control a timing of writing by the write transducers 804, 808 using delays, e.g., to offset the writing sequence variance. According to one approach, the time delay writing sequences may be determined at least in part based on the known distance between write transducer pairs and the tape speed. In further embodiments, readers may be implemented to detect servo marks written by the leading transducers, etc.

Referring now to FIG. 14, apparatus 1400 includes a first module 802 having a plurality of first write transducers 804. Apparatus 1400 may also include a plurality of second modules 902 each having a second write transducer 904.

The first write transducers 804 may be aligned along a first straight line 816, where the first straight line 816 may be oriented about perpendicular to an intended direction of tape travel 810 thereacross.

The second write transducers 904 may be aligned along a second straight line 818. The second straight line 818 may be parallel to the first straight line 816. However, the planes of deposition of the write transducers 804, 904 in an aligned pair are non-parallel to enable writing of a chevron pattern.

Referring now to FIG. 15, apparatus 1500 includes a first module 1502 having a plurality of first write transducers 1504, and a second module 1506 having a plurality of second write transducers 1508.

Embodiments which include more than one first module and more than one second module will now be described below, e.g., see FIGS. 16-17.

Figure 16:
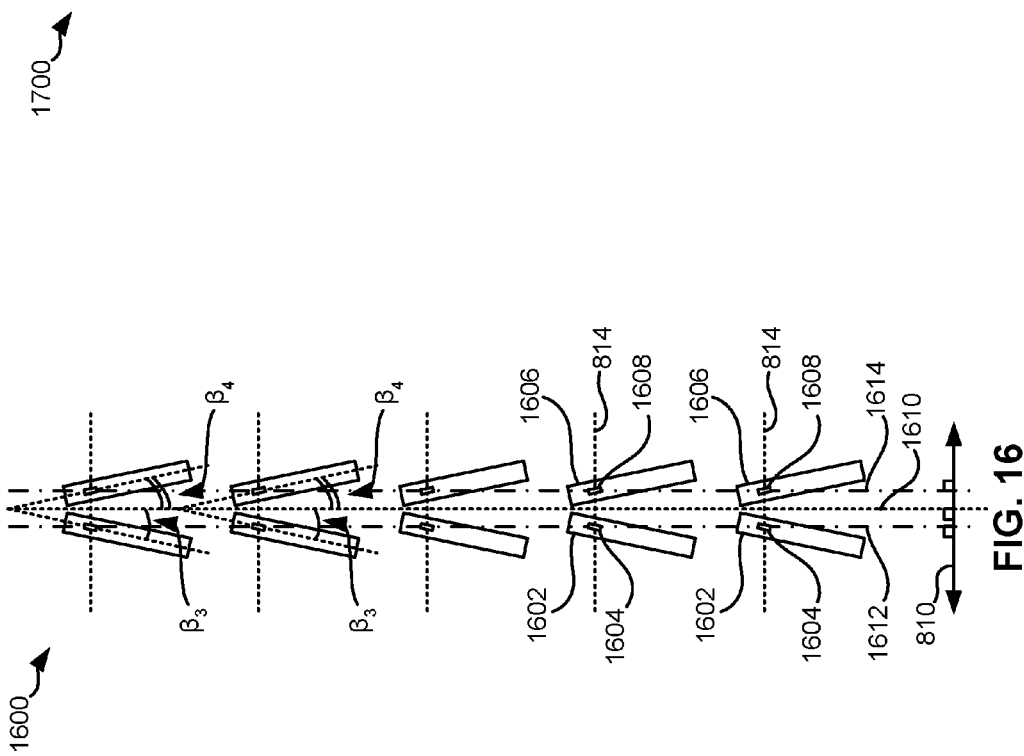
FIG. 16 is a top down view of a portion of a segmented magnetic recording write head, in accordance with one embodiment.

Referring now to FIG. 16, apparatus 1600 includes a plurality of first modules 1602 each having a first write transducer 1604. Apparatus 1600 also includes a plurality of second modules 1606 each having a second write transducer 1608.

The first write transducers 1604 may be aligned along a first straight line 1612. The second write transducers 1608 may be aligned along a second straight line 1614. According to one embodiment, the second straight line 1614 may be parallel to the first straight line 1612. In another embodiment, the first and straight lines 1612, 1614 are non-parallel.

Planes of deposition of the write gaps of the second write transducers 1608 may be oriented at an angle $\beta_4$ of greater than 4 degrees relative to planes of deposition of the write gaps of the first write transducers 1604, e.g., where each of the planes of deposition of the write gaps may be relative to an axis 1610. Similarly, the planes of deposition of the write gaps of the first write transducers 1604 may be oriented at an angle $\beta_3$ of greater than 4 degrees relative to planes of deposition of the write gaps of the second write transducers 1608. Accordingly, the sum of the angle $\beta_3$ and angle $\beta_4$ may equal at least 8 degrees according to the present embodiment.

According to one embodiment, angles $\beta_3$ and $\beta_4$ may be the same, as depicted in FIG. 16. According to another embodiment, angles $\beta_3$ and $\beta_4$ may be different.

Figure 17:
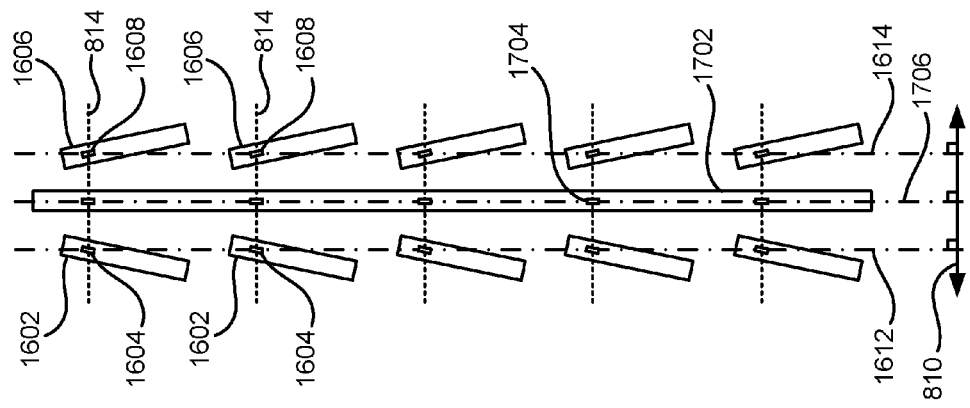
FIG. 17 is a top down view of a portion of a segmented magnetic recording write head, in accordance with one embodiment.

Referring now to FIG. 17, apparatus 1700 includes several features that are similar to those of apparatus 1600, and therefore, some features of apparatus 1700 have common numbering with apparatus 1600 of FIG. 16.

Apparatus 1700 includes a plurality first modules 1602 and a plurality of second modules 1606. Apparatus 1700 may include a third module 1702. The third module 1702 may have a plurality of third write transducers 1704. The plurality of third write transducers 1704 may be aligned along a third straight line 1706.

The third straight line 1706 may be parallel to the first and/or second straight lines 1612, 1614.

Referring now to fabrication techniques of apparatuses described herein, the apparatuses may be built on a conventional thin film wafer substrate and/or other modified wafer substrates. According to one exemplary approach, the head image of each module on the wafer may span the width of a magnetic recording tape, e.g., as in module 802 of FIG. 8A for example. The head image may span less than the width of the magnetic recording tape, e.g., as in modules 806 of FIG. 8A.

Fabrication techniques may be modified to include identification characteristics such as reflective write pole tips, fiducial marks, a combination of reflective write pole tips and fiducial marks (reflective material) built into the wafer, etc. Such identification characteristics may be used, e.g., for detecting the tips with fabrication tools for dicing, alignment, etc.

According to various embodiments, the modules of the apparatuses may be fabricated using conventional head fabrication methods, both for wafer and post wafer manufacturing.

According to one approach, during assembly/fabrication, components of the apparatus may be manipulated by a hardware actuation process for independent positioning, e.g., relative to another component of the apparatus. As previously described elsewhere herein, the orientations of these modules may be set once desired spacing(s), orientation(s) and/or write gap angular orientations are met.

According to one approach, an optical recognition system may survey the apparatus as a whole, e.g., prior to one or more of the components being positioned but non-fixedly mounted to the apparatus, to determine if one or more of the components are in a prescribed positioned, e.g., relative to a template.

As described elsewhere herein, once aligned in a desired position, one or more of the components of the apparatus may be permanently secured.

In other approaches, at least some of the modules may be translatable during servo writing for alignment purposes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a first module having a plurality of first write transducers; and
a plurality of second modules each having a second write transducer,
wherein planes of deposition of write gaps of the second write transducers are oriented at an angle of greater than 4 degrees relative to planes of deposition of write gaps of the first write transducers,
wherein the first write transducers are aligned along a first straight line,
wherein the second write transducers are aligned along a second straight line, the second straight line being parallel to the first straight line.

2. An apparatus as recited in claim 1, wherein each first write transducer is aligned with an associated second write transducer in an intended direction of tape travel.

3. An apparatus as recited in claim 1, wherein media bearing surfaces of the modules are primarily planar, wherein the media bearing surfaces of the modules lie along a common plane.

4. An apparatus as recited in claim 1, wherein at least one of the modules includes a well extending into a media bearing surface thereof, the well being configured to create a vacuum therein when a magnetic recording tape is passed thereacross.

5. An apparatus as recited in claim 1, wherein media bearing surfaces of the modules are primarily planar, wherein primarily planar portions of the media bearing surfaces of the modules lie along a common plane, wherein at least one of the modules has a beveled trailing end for causing a magnetic recording tape passing over the beveled trailing end to approach another of the modules at a wrap angle sufficient to cause skiving of air therefrom.

6. An apparatus as recited in claim 1, wherein media bearing surfaces of the modules are primarily planar, wherein the media bearing surfaces of the modules lie along offset parallel planes.

7. An apparatus as recited in claim 1, wherein the first straight line is oriented at an angle of greater than 4 degrees from perpendicular to an intended direction of tape travel thereacross.

8. An apparatus as recited in claim 1, wherein the first straight line is oriented about perpendicular to an intended direction of tape travel thereacross.

9. An apparatus as recited in claim 1, wherein the write transducers are configured to write elongated servo marks each having a longitudinal axis each oriented parallel to the plane of deposition of a write gap of the respective write transducer writing the servo mark.

10. An apparatus as recited in claim 1, further comprising:
a drive mechanism for passing a magnetic recording tape over the modules; and
a controller electrically coupled to the modules, wherein the controller is configured to control a timing of writing by the write transducers.

11. An apparatus as recited in claim 1, wherein at least one of the modules has a read transducer configured to detect a magnetic transition written by a leading one of the modules, wherein the read transducer is positioned between write transducers that are aligned in an intended direction of tape travel thereacross.

12. An apparatus as recited in claim 11, further comprising:
a drive mechanism for passing a magnetic recording tape over the modules; and
a controller electrically coupled to the modules, wherein the controller is configured to control a timing of writing by the write transducers based on detection of the magnetic transition by the read transducer.

* * * * *